United States Patent [19]

Taniuchi et al.

[11] Patent Number: 4,530,880

[45] Date of Patent: Jul. 23, 1985

[54] GRANULAR ORGANOHALIDE FLAME RETARDANT ADDITIVE

[75] Inventors: Akira Taniuchi; Setsuo Nishibori; Hirohito Komori, all of Kyoto; Motoshige Hayashi, Nara, all of Japan

[73] Assignees: Sekisui Kaseihin Kogyo Kabushiki Kaisha, Nara; Dai-Ichi Kogyo Seiyaku Co., Ltd., Shimogyo, both of Japan

[21] Appl. No.: 574,766

[22] Filed: Jan. 27, 1984

[30] Foreign Application Priority Data

Jan. 27, 1983 [JP] Japan ................................ 58-12554
Jan. 27, 1983 [JP] Japan ................................ 58-12555
Mar. 9, 1983 [JP] Japan ................................ 58-39722

[51] Int. Cl.$^3$ ................ B32B 5/16; B32B 27/00; B32B 27/20; C08K 5/02
[52] U.S. Cl. ............................ 428/402; 252/609; 428/407; 523/207; 523/220; 523/221; 524/142; 524/366; 524/369; 524/371; 524/375; 524/464; 524/465; 524/466; 524/467; 524/468; 524/503; 524/505; 524/508; 524/513; 524/514; 524/516; 524/519; 524/524; 524/525; 524/527; 524/533; 524/534; 524/536; 524/565; 524/571; 524/575
[58] Field of Search ............ 523/220, 221, 207; 524/465, 366, 371, 468, 571, 565, 575, 577, 466, 467, 142, 369, 375, 464, 503, 505, 508, 513, 514, 516, 519, 524, 525, 527, 533, 534, 536; 428/402, 407; 252/609

[56] References Cited

U.S. PATENT DOCUMENTS

| | | | |
|---|---|---|---|
| 3,058,926 | 10/1962 | Eichhorn | 521/59 |
| 3,259,593 | 7/1966 | Eichhorn | 521/155 |
| 3,287,309 | 11/1966 | Basdekis et al. | 524/515 |
| 3,301,813 | 1/1967 | Dahms et al. | 260/34.2 |
| 3,975,327 | 8/1976 | Nintz et al. | 524/469 |
| 4,069,288 | 1/1978 | Barkhuff et al. | 524/577 |
| 4,161,472 | 7/1979 | Lehr | 523/221 |
| 4,181,644 | 1/1980 | Lehr | 523/221 |
| 4,193,911 | 3/1980 | Fochesato | 524/437 |
| 4,211,687 | 7/1980 | Salee | 524/609 |
| 4,301,058 | 11/1981 | Neukirchen et al. | 524/577 |
| 4,339,556 | 7/1982 | Baer | 523/220 |

FOREIGN PATENT DOCUMENTS

7832683 11/1978 France .

OTHER PUBLICATIONS

European Search Report for Appln. No. EP 84 10 0828.
Chemical Abstracts, vol. 92, 1980; 77814, p. 66.

*Primary Examiner*—Herbert J. Lilling
*Attorney, Agent, or Firm*—Armstrong, Nikaido, Marmelstein & Kubovcik

[57] ABSTRACT

A granular flame retardant additive is provided comprising from 70 to 99.5% by weight of an organohalide flame retardant and from 0.5 to 30% by weight of thermoplastic synthetic resin as a binder. The additive is easy to handle and resistant to disintegration during transportation and mixing with fabricating resin pellets. Uniform distribution thereof in fabricated thermoplastic articles is achieved by simply co-feeding the granules and the fabricating resin to a fabricating machine.

10 Claims, No Drawings

GRANULAR ORGANOHALIDE FLAME RETARDANT ADDITIVE

BACKGROUND OF THE INVENTION

This invention relates to granular organohalide flame retardant additives for use in fabricating flame retarded plastic articles.

It is well know that a great variety of inflammable plastic articles may be rendered flame retardant by incorporating therein an appropriate amount of an organohalide flame retardant. It would be very convenient and desirable for such flame retardants to be capable of uniformly dispersing in the plastic article by simply co-feeding the flame retardant and a thermoplastic resin together to a fabricating machine.

However, there are many problems in the use of powdered or liquid flame retardants as such for said purpose. They tend to produce harmful dust upon handling. Their limited free-flowing property makes their automated continuous metering difficult. Since particle sizes are far different between the powdered flame retardant and the resin pellets, the former may be easily classified from the resin pellets prior to entering the melting zone of a fabricating machine. Thus, it is difficult to achieve uniform distribution of added flame retardants throughout the body of fabricated plastic article. Liquid flame retardants suffer from a similar problem of difficulty of uniform distribution when used in an amount sufficient to impart a desired degree of flame retardance to the inflammable thermoplastic resin.

Attempts have been made to overcome the above problems. One such attempt employs a master batch containing up to about 30% by weight of flame retardant. This method naturally requires addition of a large amount of master batch to the resin. The master batch made from a particular plastic material can only be used as a rule in fabricating articles made of the same kind of plastic material. Another attempt includes the use of pelletized or granulated flame retardants without any binder material. However, with the use of conventional dry or wet granulating technique, it is often difficult to obtain granules having a sufficient strength and a desired particle size distribution.

It is, therefore, a principal object of the present invention to provide pellets or granules of organohalide flame retardants which are free-flowing, having a desirable uniform particle size distribution and a strength so that they are not easily broken or crushed during storage, transportation and handling but are capable of uniformly dispersing in various fabricated plastic articles by simply co-feeding the granulated flame retardant and resin pellets together to a fabricating machine.

Other objects and advantages of the present invention will become apparent as the description proceeds.

DESCRIPTION OF THE INVENTION

According to the present invention, there is provided a granular flame retardant additive composition comprising from 70 to 99.5% by weight of an organohalide flame retardant and from 0.5 to 30% by weight of a thermoplastic synthetic resin as a binder material.

The term "organohalide flame retardant" as used herein means a halogen-containing organic compound which is solid or liquid at room temperature and capable of rendering various inflammable materials flame retardant. Bromine or chlorine containing flame retardants are preferable. Organohalide flame retardants are per se known in the art and their non-limiting examples include tetrabromodiphenyl ether; hexabromodiphenyl ether; decabromodiphenyl ether; tris(dichloropropyl)-phosphate; tris(dibromopropyl)phosphate; tetrbromobutane, chlorinated or brominated polystyrene; chlorinated or brominated polyphenylene; chlorinated or brominated polyethylene; chlorinated or brominated polyester; hexabromocyclododecane; monochloropentabromocyclohexane; tribromophenyl allyl ether; tribromophenyl methallyl ether; 2,2-bis(4-allyloxy-3,5-dibromophenyl)propane; 2,2-bis(4-methallyloxy-3,5-dibromophenyl)propane; 2,2-bis(4-dibromopropoxy-3,5-dibromophenyl)propane; 2,2-bis(4-dibromoisobutoxy-3,5-dibromophenyl)propane, chlorinated or brominated butadiene, isoprene or chloroprene; chlorinated or brominated dimers and trimers of butadiene, isoprene or chloroprene; and mixtures of the above chemicals. Mixtures of a flame retarant having a melting point higher than 150° C. and another flame retardant having a melting point lower than 150° C. in a weight ratio from 1:0.1 to 1;1, such as a mixture of hexabromocyclododecane and 2,2-bis(4-allyloxy-3,5-dibromophenyl)propane or tribromophenyl allyl ether in said ratio are also preferable. These mixtures can solidify into a rigid state by vigorously mixing in a granulator and then cooling.

Examples of the thermoplastic synthetic resins used as a binder material in the present invention include polystyrene, poly(methyl methacrylate), styrene-butadiene copolymer, styrene-maleic anhydride copolymer, polyester, polyamide, polyethylene, poly(ethylene-vinyl acetate), chlorinated polyethylene, polyvinyl chloride, polycarbonate and the like. Polymers and copolymers made from butadiene, styrene, acrylate or methacrylate are preferable not only because of their solubilities in conventional volatile solvents but also because the granules made therefrom are easily driable, non-hygroscopic, and non-crashable but easily disintegratable under heat and pressure within a molding or extruding machine.

The proportion of the organohalide flame retardant and the binder are such that the final granules contain from 70%, preferably from 90% by weight of the organohalide flame retardant and the remainder of the resin binder.

Any conventional granulating technique may be employed for producing the granules or pellets of this invention.

A preferred method include the steps of kneading a powdered organohalo flame retardant with a solution of binder resin, dividing the resulting mass into granules of suitable size and then drying.

Any solvent may be used for preparing the binder solution. Examples of preferred solvents include methylene chloride, chloroform, trichloroethylene, carbon tetrachloride, benzene, toluene, xylene, methyl ethyl ketone and mixtures of these solvents. Low-boiling point, chlorine-containing hydrocarbons are suitable because of their nonflammability and ease to evaporate. The concentration of binder resin in the solution is preferably as high as possible for environmental and economical reasons, provided that the powdered flame retardant may be kneaded and granulated with the solution.

After kneading, the resulting mass is divided into granules of suitable size. This may be accomplished, for example, by extruding the mass through a die having a number of perforations and cutting the extrudate into a suitable size. Biaxial screw type extruders are preferable. The resulting granules are then dried to remove the solvent to give the granular flame retardant additive composition of the present invention.

Alternatively, the granular flame retardant may be prepared without any solvent. This method includes the steps of directly mixing two components and compressing the mixture at an elevated temperature near or above the melting point of the binder resin to form a sheet and then dividing the sheet into granules of suitable size.

The resulting granules may have any desired shape such as cylindrical, spherical and cubic shapes. The average particle size of the granular flame retardant additive composition of this invention may vary depending upon its use and the size of fabricating resin pellets to which the granular flame retardant is added, but generally ranges from 0.5 to 8 mm, preferably from 0.5 to 5 mm in diameter. In case of cylindrical granules, the length may range from one to ten times of the diameter.

The granular flame retardant additive of this invention may optionally contain further ingredients such as resin modifiers, enhancing agents, e.g. antimony trioxide, titanium dioxide, molybdenum oxide, zirconium silicate, zinc borate and the like. Stabilizers, pigments, antiweathering agents, UV absorbing agents, matting agents, antistatic agents, extenders and other additives may also be added.

Examples of the inflammable thermoplastic resins to which the granular flame retardant additive of the invention may be added include polystyrene resin, methacrylate resin, ABS resin, styrene maleic anhydride resin, polyester resin, polyamide resin, polyethylene resin, polypropylene resin, EVA resin, polycarbonate resin, polyacetal resin and cellulose derivatives such as cellulose acetate. The binder resin of the granular flame retardant additive need not be the same as the fabricating resin to which the flame retardant additive is added, but preferably has a good mutual solubility with the fabricating resin.

The proportion of the granular flame retardant additive of the invention relative to the fabricating resin varies depending upon the nature of particular fabricating resins, the nature and the content of particular organohalide flame retardant in the granules, and generally ranges from 0.1 to 30 parts by weight per 100 parts by weight of the fabricating resin.

The flame retardant granules and the fabricating resin may be mixed at a predetermined ratio and then fed to a fabricating machine such as injection molding machines and extruding machines, or alternatively they may be separately fed to the machine by a continuous metering system, respectively. The mixture is molten within the machine to achieve uniform distribution and fabricated into a desired shape. Thus, the present invention may minimize or eliminate many problems and difficulties which have been encountered by the prior art.

The invention is illustrated by the following examples. All parts and percents therein are by weight unless otherwise indicated.

Preparation of granular flame retardant additive

EXAMPLES 1 TO 3

100 parts of a flame retardant shown in Table 1 and 10 parts of a 30% solution of poly(methyl methacrylate) resin (DELEPET 80N, Asahi Chemical Industry Co., Ltd.) in methylene chloride were charged in a high speed mixer (Fukae Kogyo Co., Ltd.) and thoroughly mixed for 2 minutes at a agitator speed of 400 r.p.m. and a chopper speed of 300 r.p.m. The resulting mass was extruded by a biaxial screw extruder (Model FSWG 3B, Fukae Kogyo Co., Ltd.) through a die having a number of perforations of 3 mm diameter at a rate of 90 kg/hour. The resulting extrudates having a diameter of about 3 mm and a length about 7 to 10 mm were dried in a fluid bed dryer to remove the solvent.

As a control, 20 parts of water was used instead of the resin solution.

The strength properties of the resulting granules are shown in Table 1.

TABLE 1

| Example | Organohalide | Compression strength (1) (kg/cm$^2$) | Percent disintegration (2) |
|---|---|---|---|
| 1 | Hexabromocyclododecane | 3.0 | 0.7 |
| 2 | Monochloropentabromocyclohexane | 3.4 | 1.7 |
| 3 | Bis(4-allyloxy-3,5-dibromophenyl)propane | 2.8 | 5.2 |
| Control 1 | Hexabromocyclododecane | 0.8 | 25.99 |

Note
(1) Measured by an autograph (Shimadzu Corporation).
(2) 70 g of each sample were placed in a 250 ml polyethylene bottle along with two 10 mm steel balls and two 15 mm steel balls. The bottle was shaken on a vibrator (MK type, Model V-S) for 10 minutes at 270 r.p.m. Percent disintegration is defined by the amount of fine particles passing through a standard 10 mesh screen after the shaking.

EXAMPLE 4 TO 6

The procedure of Examples 1–3 was repeated except that 100 parts of a flame retardant shown in Table 2 and 20 parts of a 20% solution of polystrene in toluene were used. The strength properties of the resulting granules as shown in Table 2.

TABLE 2

| Example | Organohalide | Ratio | Percent disintegration |
|---|---|---|---|
| 4 | Hexabromocyclododecane/ tribromophenyl allyl ether | 8:2 | 1.8 |
| 5 | Monochloropentabromocyclohexane/brominated chloroprene | 7:3 | 0.9 |
| 6 | Bis(4-dibromopropoxy-3,5-dibromophenyl)propane | — | 2.8 |

EXAMPLES 7 TO 9

The procedure of Examples 1–3 were repeated except that 75 parts of a flame retardant shown in Table 3, 25 parts of antimony trioxide and 10 parts of a 30% solution of poly(methyl methacrylate) resin (DELEPET 80N, Asahi Chemical Industry Co., Ltd.) in methylene dichloride were used. The strength properties of the resulting granules are shown in Table 3.

TABLE 3

| Example | Organohalide | Compression strength (kg/cm$^2$) | Percent disintegration |
|---|---|---|---|
| 7 | Tribromophenyl allyl ether | 3.2 | 2.1 |

TABLE 3-continued

| Example | Organohalide | Compression strength (kg/cm$^2$) | Percent disintegration |
|---|---|---|---|
| 8 | Decabromodiphenyl ether | 3.8 | 3.5 |
| 9 | Poly(tribromostyrene) | 4.0 | 2.8 |
| Control 2 | Tribromophenyl allyl ether | 1.0 | 21.4 |

EXAMPLES 10 TO 12

The procedure of Examples 1-3 were repeated except that 100 parts of a flame retardant shown in Table 4 and 20 parts of a 20% solution of polystyrene in toluene were used. The strength properties of the resulting granules are shown in Table 4.

TABLE 4

| Example | Organohalide | Ratio | Percent disintegration |
|---|---|---|---|
| 10 | Brominated polyphenylene/ tetrabromodiphenyl ether | 8:2 | 1.6 |
| 11 | Decabromodiphenyl ether/ tetrabromobutane | 7:3 | 0.2 |
| 12 | Hexabromodiphenyl ether | — | 2.6 |

EXAMPLE 13

The procedure of Examples 1-3 was repeated except that 100 parts of a 9:1 mixture of hexabromocyclododecane/bis(4-allyloxy-3,5-dibromophenyl)propane and 10 parts of a 30% solution of poly(methyl methacrylate) in methylene dichloride were used.

Fabrication of flame retarded specimen

EXAMPLE 14

2000 parts of polystyrene resin (ESTYRENE G-20, Nippon Steel Chemical Co., Ltd.) and 70 parts of the granular flame retardant additive of Example 1 were thoroughly mixed in a ribbon blender for 10 minutes. A 3×6×15 mm specimen was injection molded from the mixture at 230° C. 10 specimen samples were taken from each 10 shots and tested for the burning characteristics in accordance with the method of ASTM D-2863-70. Oxygen index (O.I.) and its variation among sample specimens were compared with control specimens which utilized an equivalent amount of powdered hexabromocyclododecane or Control 1 in Table 1. The results are shown in Table 5.

TABLE 5

| Type of flame retardant | O.I. (%) | Variation of O.I. (%) |
|---|---|---|
| Granules of Ex. 1 | 26.8–27.2 | 0.4 |
| Powdered hexabromocyclododecane | 25.0–26.8 | 1.8 |
| Control 1 | 25.4–26.8 | 1.4 |

EXAMPLE 15

2000 parts of polypropylene resin (J-115G, Ube Industries, Ltd.) and 70 parts of the granular flame retardant additive of Example 7 were thoroughly mixed in a ribbon blender for 10 minutes. A 3×6×15 mm specimen was injection molded from the mixture at 230° C. 10 specimen samples were taken from each 10 shots and tested for the burning characteristics as in Example 14. Control specimens contained an equivalent amount of granules of Control 2 in Table 3 or powdered tribromophenyl allyl ether. The results are shown in Table 6.

TABLE 6

| Type of flame retardant | O.I. (%) | Variation of O.I. (%) |
|---|---|---|
| Granules of Ex. 7 | 29.3–29.8 | 0.5 |
| Control 2 in Table 3 | 28.5–29.8 | 1.3 |
| Powdered tribromophenyl allyl ether | 28.1–30.3 | 2.2 |

EXAMPLE 16

30 parts of expandable polystyrene beads containing about 6.7% of butane, 70 parts of polystyrene having a melt index of 7, 2 parts of finely divided talc (foam conditioning agent), 0.2 parts of dibutyltin maleate (heat stabilizer), 0.1 part of brown pigment and 2.5 parts of the granular flame retardant additive of Example 4 were throughly mixed in a ribbon blender for 10 minutes.

The mixture was continuously fed to an extruder having an inner diameter of 50 mm. The die was a 18×146 mm plate of 20 mm thickness defining 485 perforations each having a diameter of 1.6 mm. The perforations were vertically disposed in nine rows. Those perforations in two outer rows and lines were spaced by 2 mm and the remainder spaced by 4 mm.

The extruder was maintained at a temperature of 150°–200° C. and the bundle of extrudates was laterally compressed while it is hot and then cooled to a foamed plate of 20 mm thickness and 150 mm width having an apparent density of 0.28 g/cm$^3$. Ten specimen samples were taken at each one hour interval and tested for oxygen index and its variation in accordance with the method of ASTM D-2863-70. The results are shown in Table 7.

TABLE 7

| Flame retardant | O.I. (%) | Variation of O.I. (%) | Extruding stability |
|---|---|---|---|
| Granules of Ex. 4 | 27.5–29.2 | 1.7 | Very stable |
| Powdered mixture of flame retardants used in Ex. 4 | 24.8–29.8 | 5.0 | Unstable, extrusion rate gradually decreased after 2 hours. |

EXAMPLE 17

100 parts of polystyrene resin(ESBRITE 7M, Sumitomo Chemical Co., Ltd.), 0.5 parts of talc (foam conditioning agent), 0.2 parts of dibutyltin maleate (heat stabilizer) and 2.0 parts of the granular flame retardant additive of Example 13 were thoroughly mixed in a ribbon blender for 10 minutes.

The mixture was continuously fed to an extruder having a first cylindrical passage of 50 mm diameter and a second cylindrical passage of 65 mm diameter serially connected to the end of the first passage. A 1:1 mixture of dichlorodifluoromethane and methylene dichloride was continuously injected as a foaming agent at the end of the first cyrindrical passage into the flow of molten resin at a proportion of 12 parts per 100 parts of resin. The temperature of extruder was maintained at 180°–200° C. on the inlet side and at 100°–120° C. on the outlet side. The mixture was finally extruded though a die defining a rectangular orifice of 2.5 mm height and 50 mm width.

The extrudate was vertically compressed between two plates having a Teflon coating while it is hot and then cooled to a foamed plank of 90 mm thickness and 150 mm width having an apparent desity of 0.03 g/cm³.

Ten specimen samples were taken at each one hour interval and tested for burning properties as in Example 16. The results are shown in Table 8.

TABLE 8

| Flame retardant | O.I. (%) | Variation of O.I. (%) | Extruding stability |
|---|---|---|---|
| Granules of Ex. 13 | 28.5–30.0 | 1.5 | Very good |
| Powder mixture of flame retardants used in Ex. 13 | 26.0–30.5 | 4.5 | Unstable, variation in dimention was great after 5 hours. |

EXAMPLE 18

90 parts of hexabromocyclododecane and 10 parts of a thermoplastic resin shown in Table 9 were throughly mixed in a powdered state. The mixture was compressed by a hot press at 150° C. at a pressure of 50 kg/cm² for 3 minutes. The resulting sheet having a thickness of about 1 mm was cooled to 60° C. and granulated by crushing. The strength properties of the granules were determined as in Examples 1-3.

The procedure of Example 14 was repeated except that granules of Example 13 were replaced by the granules prepared by the above method. The results obtained are shown in Table 9.

TABLE 9

| Flame retardant | Binder resin | Percent disintegration | O.I. (%) | Variation in O.I. (%) |
|---|---|---|---|---|
| Hexabromocyclododecane | EVA, 30 mesh passing (SOABREN C1, Nippon Synthetic Chemical Industry Co.) | 14.5 | 26.3–27.2 | 0.9 |
| Hexabromocyclododecane | Poly(methyl methacrylate), 30 mesh passing (METHAPLENE P530, Mitsubishi Rayon Co., Ltd.) | 12.4 | 26.8–27.2 | 0.4 |
| Hexabromocyclododecane | Polystyrene resin, 30 mesh passing (Sekisui Kaseihin Kogyo K.K.) | 15.2 | 26.3–27.2 | 0.9 |
| Hexabromocyclododecane powder | — | 100 | 25.0–26.8 | 1.8 |

We claim:

1. A granular flame retardant additive composition for use in fabricating thermoplastic articles comprising from 70 to 99.5% by weight of the composition of a mixture of at least 50% by weight of an organohalide flame retardant having a melting point above 150° C. and the balance of an organohalide flame retardant having a melting point below 150° C., and from 0.5 to 30% by weight of the composition of a thermoplastic synthetic resin as a binder material of said organohalide flame retardant.

2. The composition of claim 1, wherein said granules have an average particle size from 0.5 to 5.0 mm.

3. The composition of claim 1, wherein said thermoplastic synthetic resin is a polymer or copolymer derived from styrene, butadiene or methyl methacrylate.

4. The composition of claim 1, wherein said organohalide flame retardant contains chlorine and/or bromine.

5. The composition of claim 1 wherein said granules have an average particle size from 0.5 to 8.00 mm.

6. A method for fabricating flame retarded thermoplastic articles which comprises the steps of co-feeding the flame retardant additive composition of claim 1 and a thermoplastic resin to a fabricating machine, melting both components within the machine, and fabricating the molten mass into a desired shape.

7. The method according to claim 6, wherein the ratio of the flame retardant composition relative to said thermoplastic resin is from 0.1 to 30 parts by weight per 100 parts by weight of said thermoplastic resin.

8. The method according to claim 6, wherein said thermoplastic resin is polystyrene resin, poly(methyl methacrylate) resin, ABS resin, styrene-maleic anhydride resin, polyester resin, polyamide resin, polyethylene resin, polypropylene resin, EVA resin, polycarbonate resin, polyacetal resin or cellulose derivatives.

9. The method according to claim 6, wherein said fabricating is injection molding.

10. The method according to claim 6, wherein said fabricating is extruding.

* * * * *